(12) United States Patent
Wang et al.

(10) Patent No.: US 11,704,328 B2
(45) Date of Patent: Jul. 18, 2023

(54) COLUMNAR STORAGE AND QUERY METHOD AND SYSTEM FOR TIME SERIES DATA

(71) Applicants: TSINGHUA UNIVERSITY, Beijing (CN); Timecho AI Technology Co. Ltd, Shanghai (CN)

(72) Inventors: Jianmin Wang, Beijing (CN); Xiangdong Huang, Beijing (CN); Chen Wang, Beijing (CN); Jialin Qiao, Beijing (CN); Tian Jiang, Beijing (CN); Mingsheng Long, Beijing (CN); Jiaguang Sun, Beijing (CN)

(73) Assignees: Tsinghua University, Beijing (CN); Timecho AI Technology Co. Ltd, Shanghai (CN)

( * ) Notice: Subject to any disclaimer, the term of this patent is extended or adjusted under 35 U.S.C. 154(b) by 333 days.

(21) Appl. No.: 16/769,151

(22) PCT Filed: Dec. 20, 2018

(86) PCT No.: PCT/CN2018/122272
§ 371 (c)(1),
(2) Date: Jun. 2, 2020

(87) PCT Pub. No.: WO2019/120240
PCT Pub. Date: Jun. 27, 2019

(65) Prior Publication Data
US 2021/0157811 A1    May 27, 2021

(30) Foreign Application Priority Data
Dec. 20, 2017 (CN) .......................... 201711384490.X

(51) Int. Cl.
*G06F 16/00* (2019.01)
*G06F 16/2458* (2019.01)
(Continued)

(52) U.S. Cl.
CPC ........ *G06F 16/2474* (2019.01); *G06F 16/221* (2019.01); *G06F 16/248* (2019.01); *G06F 16/2477* (2019.01)

(58) Field of Classification Search
None
See application file for complete search history.

(56) References Cited

U.S. PATENT DOCUMENTS

| | | | |
|---|---|---|---|
| 6,301,578 B1 * | 10/2001 | Harris | G06F 30/33 707/693 |
| 2012/0330931 A1 * | 12/2012 | Nakano | G05B 23/0283 707/E17.082 |
| 2017/0270183 A1 * | 9/2017 | Kuroda | G06F 16/211 |

FOREIGN PATENT DOCUMENTS

| | | |
|---|---|---|
| CN | 103003803 A | 3/2013 |
| CN | 103092905 A | 5/2013 |

(Continued)

OTHER PUBLICATIONS

Li, Q., et al., "Data Structures and Classical Algorithms," General Higher Education "Eleventh Five-Year" National Planning Textbook Computer Series (2015), pp. 278-289, Tsinghua University Press, Beijing, China.

(Continued)

*Primary Examiner* — Thu Nguyet T Le
(74) *Attorney, Agent, or Firm* — Stites & Harbison, PLLC; David W. Nagle, Jr.; Gary N. Stewart

(57) ABSTRACT

A columnar storage method and a query method and system for time series data. The storage method includes: dividing a column of time series data into a plurality of pages, wherein each page stores a part of data points of the column of time series data and the sum of the data points stored in all the pages is all the data points in the column of time series data (S1); and setting two parts, i.e., a page header and a page body, for each page, storing summary index informa- (Continued)

tion of all the data points in the page in the page header of the page and storing data value information of all the data points in the page in the page body of the page (S2).

10 Claims, 4 Drawing Sheets

(51) Int. Cl.
*G06F 16/22* (2019.01)
*G06F 16/248* (2019.01)

(56) References Cited

FOREIGN PATENT DOCUMENTS

| CN | 103942343 A | 7/2014 |
| CN | 105242882 A | 1/2016 |
| CN | 107256233 A | 10/2017 |
| CN | 107871022 A | 4/2018 |

OTHER PUBLICATIONS

"In depth analysis of parquet column storage format," https://www.infoq.cn/article/in-depth-analysis-of-parquet-column-storage-format (Aug. 6, 2015).

\* cited by examiner

COLUMNAR STORAGE AND QUERY METHOD AND SYSTEM FOR TIME SERIES DATA

CROSS-REFERENCE TO RELATED APPLICATION

This application is a national phase entry of International Application No. PCT/CN2018/122272 filed on Dec. 20, 2018, which is based on and claims priority to Chinese Patent Application No. 201711384490 filed on Dec. 20, 2017 and entitled "Columnar Storage and Query Method and System for Time Series Data", which is incorporated herein by reference in its entirety.

BACKGROUND

Technical Field

The present disclosure relates to the field of data storage technologies, and specifically, to a columnar storage method and a query method and system for time series data.

Description of the Related Art

With the development of computer technology and industrial informatization, the amount of data generated by the industrial field is increasing. Time series data is widely used in the industrial applications and is one of the main data type of industrial data. As the main data type in industrial big data, its storage and query problems have become a key topic in the research on industrial big data.

The time series data is usually generated by a machine sensor at some frequencies, and once a data point is generated, its value is almost unnecessary to be modified. Secondly, the time series data oriented applications mostly require analytical query other than fine-grained insertion, deletion, modification and selection operations. Therefore, in combination with the workload of the time series data insertion and query in industrial applications, using columnar file format is more suitable for storing massive time series data.

Currently, the popular columnar file formats such as Parquet, ORCFile, etc. do not optimize for time series data. When the time series data is stored in such a columnar format, a complicated nested structure is adopted, and data values and timestamps of a group of time series data cannot be stored in one column at the same time, data values and timestamps of the group of time series data cannot be indexed simultaneously in a column of data and thus these problems will slow down the query speed of the time series data and more system resources are consumed.

BRIEF SUMMARY

The present disclosure provides a columnar storage method and system for time series data and a columnar query method and system for time series data that overcome the problems above or at least partially solve the problems above, and can improve the query speed of the time series data.

According to a first aspect of the present disclosure, a columnar storage method for time series data is provided, including:

dividing a time series data into a plurality of pages, wherein each page stores a part of data points of the time series data. That is, all the data points in these pages form a time series; and Each page consists of two parts, i.e., a page header and a page body. For each page, storing summary information of all the data points in the page as an index into the page header of the page and storing data value information of all the data points in the page in the page body of the page. Based on the technical solution above, the present disclosure can also be improved as follows.

Further, the summary index information in the page header of each page includes the number of all the data points in the page, a maximum value in timestamps corresponding to all the data points, a minimum value in the timestamps corresponding to all the data points, a maximum value in data values of all the data points and a minimum value in the data values of all the data points; detailed data value histogram can also be stored into the page header; and the data value information of all the data points in the page body of each page includes a timestamp set for all the data points of the page and a data value set for all the data points of the page.

Further, all the timestamps in the timestamp set have the same data type and the data value set can include different data types of data values; the storage method further includes:

performing data encoding on all the timestamps in the timestamp set; and encoding respective data value using a corresponding data encoding method according to the data type of the respective data value in the data value set.

Further, each page occupies the same fixed storage space.

According to a second aspect of the present disclosure, a query method for time series data is provided, including:

For each page, reading its summary index information to determining whether data points that satisfy the query filter condition are present in the page according to the summary index information in the page.

If not satisfied, then skip the page directly and continue to check the next page. If satisfied partially, then check the data points in the page and add the qualified data into the result set; If satisfied totally, then add the data points in the page into the result set.

Traverse all pages to get the final query result.

Further, the query filter condition includes a given timestamp range and/or a given data value range, and the determining whether data points that satisfy the query filter condition are present in the page according to the summary index information in the page specifically includes:

determining whether a timestamp range corresponding to all the data points in each page and the given timestamp range have an overlapping portion according to the maximum value in timestamps corresponding to all the data points and a minimum value in the timestamps corresponding to all the data points in the summary index information in each page and determining whether the data value range corresponding to all the data points in each page and the given data value range have an overlapping portion according to a maximum value in data values of all the data points and a minimum value in the data values of all the data points in the summary index information in each page; and determining that the data points that satisfy the query filter condition are present in the page if the timestamp range corresponding to all the data points in each page and the given timestamp range have the overlapping portion and/or the data value range corresponding to all the data points in each page and the set data value range have the overlapping portion, and otherwise, determining that no data points that satisfy the query filter condition are present in the page.

Further, the query method further includes:

decoding data information of all the data points in the page to acquire decoded data information if the data points that satisfy the query filter condition are present in the page, wherein the data information includes a timestamp set for all the data points and a data value set for all the data points in the page.

Further, the screening all the data points that satisfy the query filter condition and adding them into the query result set if the data points that satisfy the query filter condition are present in the page specifically include:

determining whether a timestamp of each data point is within the given timestamp range according to the timestamp of each data point in the timestamp set of the page and determining whether a data value of each data point is within the set data value range according to the data value of each data point in the data value set of the page; and screening all the data points of which the timestamp is within the given timestamp range and the data value is within the set data value range in the page as the data points that satisfy the query filter condition.

According to a third aspect of the present disclosure, a columnar storage system for time series data is provided, including:

a dividing module configured to divide a column of time series data into a plurality of pages, wherein each page stores a part of data points of the column of time series data and the sum of the data points stored in all the pages is all the data points in the column of time series data; and a storage module configured to set two parts, i.e., a page header and a page body, for each page, store summary index information of all the data points in the page in the page header of the page and store data value information of all the data points in the page in the page body of the page.

According to a fourth aspect of the present disclosure, a query system for time series data is provided, including:

a reading module configured to read one page of a column of time series data, a determining module configured to determine whether data points that satisfy a query filter condition are present in the page according to summary index information in the page; and a screening module configured to screen all the data points that satisfy the query filter condition and add them into a query result set if the determining module determines that the data points that satisfy the query filter condition are present in the page; and call the reading module to read a next page if the determining module determines that no data points that satisfy the query filter condition are present in the page; and a traversing module configured to traverse all pages to get a final query result set.

By the columnar storage method and system for time series data and the query method and system for time series data provided by the present disclosure, timestamps and specific data values of a group of time series data can be stored in one column and thus the I/O of a magnetic disc is reduced during data query and the query speed of data is accelerated by dividing the data according to pages and establishing summary index information, respectively.

DETAILED DESCRIPTION

The specific implementations of the present disclosure are further described in detail below with reference to the drawings and embodiments. The following embodiments are intended to illustrate the disclosure, but are not intended to limit the scope of the disclosure.

Figure 1:
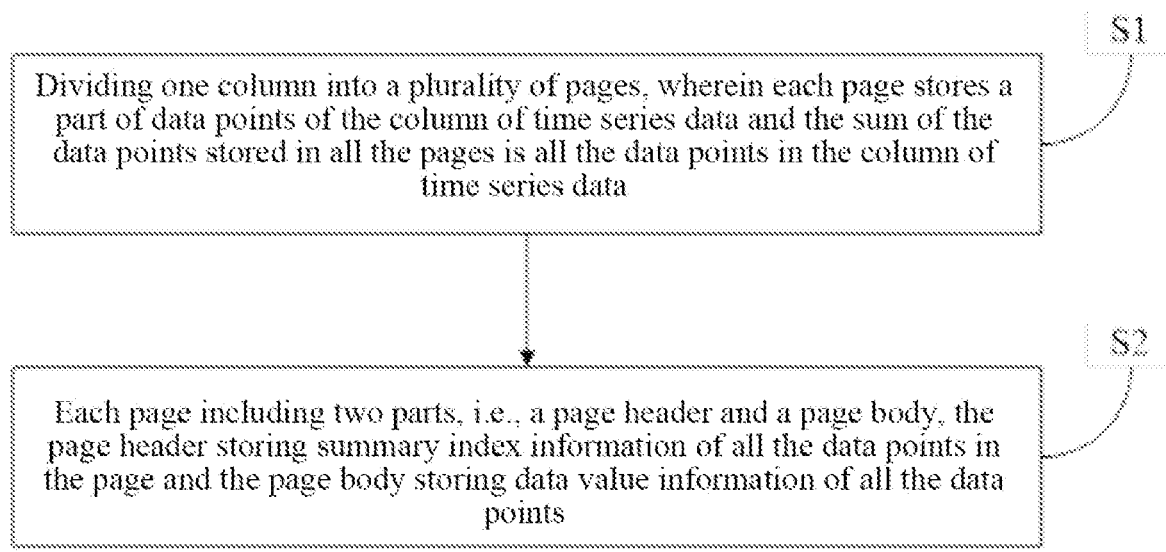
FIG. 1 is a flowchart of a columnar storage method for time series data according to an embodiment of the present disclosure.

Referring to FIG. 1, a columnar storage method for time series data according to an embodiment of the present disclosure is provided, which can simultaneously store timestamps and specific data values of all the data points of a time series in one column, thereby improving query efficiency of the time series data. The method comprises: dividing a column of time series data into a plurality of pages, wherein each page stores a part of data points of the column of time series data and the sum of the data points stored in all the pages is all the data points in the column of time series data; setting two parts, i.e., a page header and a page body, for each page, storing summary index information of all the data points in the page in the page header of the page and storing data value information of all the data points in the page in the page body of the page.

The time series data refers to time series data and is a data column recorded in a time order by the same unified indicator, and each data point of a group of time series data includes a timestamp and a specific data value of the data point. Since only the timestamps of all the data points can be stored as one column, and the data values of all the data points can be stored as another column according to the existing columnar storage method, the query efficiency of data is reduced.

In order to solve the problem above, the embodiment adopts paging storage, specifically, dividing a column of time series data into a plurality of pages, wherein each page stores a part of data points of the column of time series data and the sum of the data points stored in all the pages is all the data points in the column of time series data. Wherein, each page occupies the same fixed storage space. The number of the data points stored in each page is not necessarily the same since each data point has different sizes.

Each page includes two parts, i.e., a page header and a page body, wherein the page header mainly stores summary index information of all the data points in the page and the page body mainly stores data value information of all the data points in the page.

Based on the embodiment above, in an embodiment of the present disclosure, the summary index information in the page header of each page includes the number of all the data points in the page, a maximum value in timestamps corresponding to all the data points, a minimum value in the timestamps corresponding to all the data points, a maximum value in data values of all the data points and a minimum value in the data values of all the data points; and the data value information of all the data points in the page body of each page includes a timestamp set for all the data points of the page and a data value set for all the data points of the page.

In an embodiment of the present disclosure, the timestamps and data values corresponding to all the data points in each page are stored using a respective set, i.e., the timestamps of all the data points in one page are stored in a timestamp set of the page body and the data values of all the data points in one page are stored in a data value set of the page body. In an embodiment of the present disclosure, each timestamp in the timestamp set is in one-to-one correspondence with each data value in the data value set, identification information can be set for each data value and the timestamps in the timestamp set may correspond to the data values in the data value set according to the identification information.

Based on the various embodiments above, in an embodiment of the present disclosure, all the timestamps in the timestamp set have consistent data types and the data value set includes different data types of data values. The storage method further includes: performing data encoding on all the timestamps in the timestamp set using the same data encoding method; and encoding respective data value using a corresponding data encoding method according to the data type of the respective data value in the data value set.

In this embodiment, the timestamp of each data point in the timestamp set of the page body of each page has the same data type and all the timestamps are represented by the same data type. While all the data values in the data value set in each page may include various data types, for example, the data type may be an int type, a long type, a float type, and the like. In this embodiment, data encoding is performed according to different data types in the timestamp set and the data value set, respectively. Data encoding needs to be performed on all the timestamps only using one data encoding method since each timestamp in the timestamp set has the same data type. While the data value is encoded using a corresponding data encoding method according to different data types since all the data values in the data value set may have various different data types. In this embodiment, an optimal encoding method is selected in combination with different data types, and by encoding the data through different data encoding methods, the compression ratio of the data can be improved and the use of the storage space is reduced.

Figure 2:
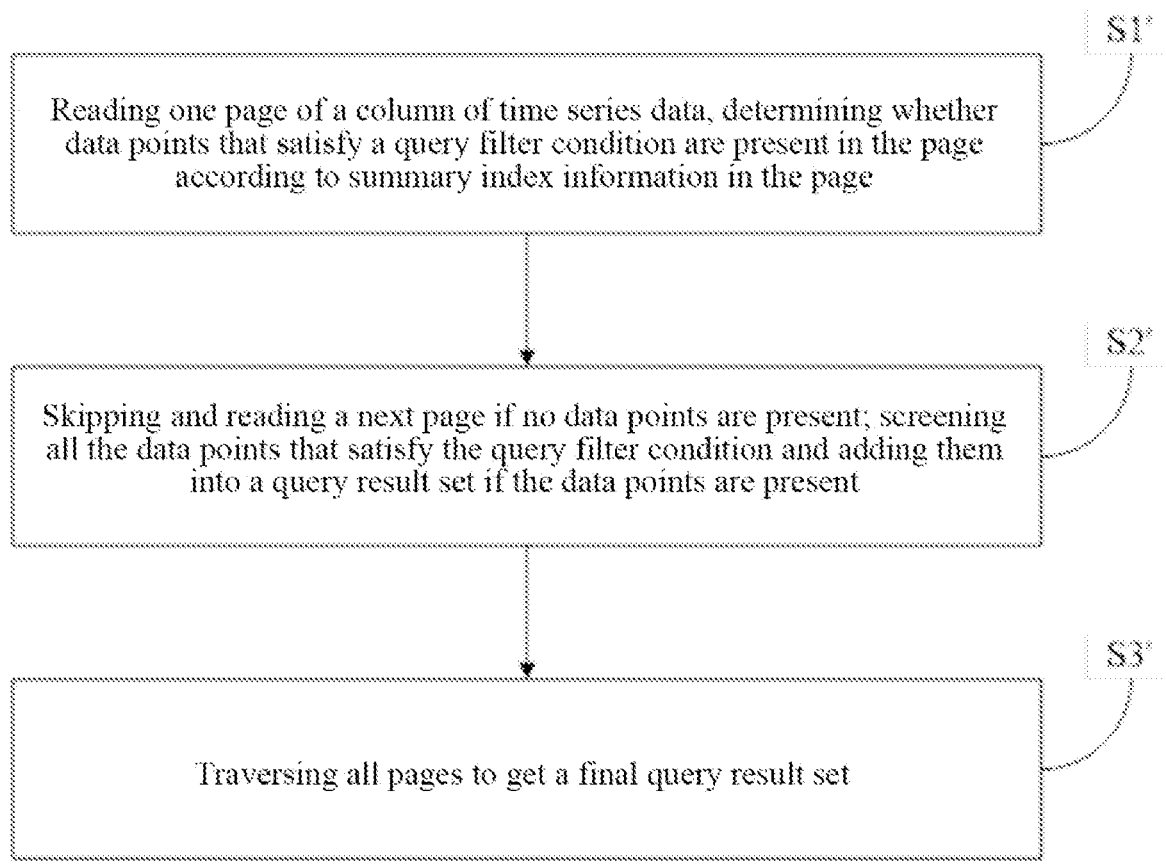
FIG. 2 is a flowchart of a query method for time series data according to another embodiment of the present disclosure.

Referring to FIG. 2, a query method for time series data according to an embodiment of the present disclosure includes: reading one page of a column of time series data, determining whether data points that satisfy a query filter condition are present in the page according to summary index information in the page; skipping and reading a next page if no data points are present; screening all the data points that satisfy the query filter condition and adding them into a query result set if the data points are present; and traversing all pages to get a final query result set.

The embodiments above describe the columnar storage process of the time series data. When the data query is performed, a first page of the column of time series data is sequentially read, it is determined first whether the data points that satisfy the query filter condition are present in the page according to the summary index information of all the data points in the page stored in the page header of the page and the page is skipped and a next page is read if no data points that satisfy the query filter condition are present in the page. All the data points that satisfy the query filter condition are screened and added into the query result set if the data points that satisfy the query filter condition are present in the page. All the pages are traversed to acquire the data points that satisfy the query filter condition in each page, and finally, all the data points that satisfy the query filter condition in all the pages are returned as the query result.

Based on the various embodiments above, in another embodiment of the present disclosure, the query filter condition includes a given timestamp range and/or a set data value range, and the determining whether data points that satisfy the query filter condition are present in the page according to the summary index information in the page specifically includes: determining whether a timestamp range corresponding to all the data points in each page and the given timestamp range have an overlapping portion according to a maximum value in timestamps corresponding to all the data points and a minimum value in the timestamps corresponding to all the data points in the summary index information in each page and determining whether a data value range corresponding to all the data points in each page and the set data value range have an overlapping portion according to a maximum value in data values of all the data points and a minimum value in the data values of all the data points in the summary index information in each page; and determining that the data points that satisfy the query filter condition are present in the page if the timestamp range corresponding to all the data points in each page and the given timestamp range have the overlapping portion and/or the data value range corresponding to all the data points in each page and the set data value range have the overlapping portion, and otherwise, determining that no data points that satisfy the query filter condition are present in the page. Since the maximum value in the timestamps of all the data points, the minimum value in the timestamps of all the data points, the maximum value in the data values corresponding to all the data points and the minimum value in the data values corresponding to all the data points are included in the summary index information, the query filter condition in this embodiment is the given timestamp range or the set data value range, and can also be the given timestamp range and the set data value range at the same time. The following takes the query filter condition being the given timestamp range as an example. According to the maximum value and the minimum value in the timestamp set of each page, it can be known that the timestamps corresponding to all the data points in the page are within the range between the maximum value and the minimum value and thus it is determined that whether the timestamp range of all the data points in each page and the given timestamp range have an overlapping portion, the page is a page that satisfies the query filter condition if the overlapping portion exists and pages that satisfy the query filter condition in all the pages are filtered out.

If the query filter condition is the set data value range and the query filter condition is the given timestamp range and the set data value range, the query method is similar to that in which the query filter condition is the given timestamp range, and is no longer described herein.

Based on the various embodiments above, in an embodiment of the present disclosure, the query method further includes: decoding data information of all the data points in the page to acquire decoded data information if the data points that satisfy the query filter condition are present in the page, wherein the data information includes the timestamp set for all the data points and the data value set for all the data points in the page.

After all the pages that satisfy the query filter condition are filtered out according the query filter condition, all the data points in the pages that satisfy the query filter condition are decoded to acquire an original timestamp set and a data value set corresponding to all the data points. In this embodiment, the pages that satisfy the query filter condition are filtered out firstly according to the summary index information of each page, and then the data points in the pages that satisfy the query filter condition are decoded without decoding the data points in the pages that do not satisfy the query filter condition, thereby avoiding unnecessary decoding process, saving time, and speeding up the query speed of the entire data.

Based on the various embodiments above, in an embodiment of the present disclosure, the screening all the data points that satisfy the query filter condition and adding them into the query result set if the data points that satisfy the query filter condition are present in the page specifically include: determining whether the timestamp of each data point is within the given timestamp range according to the timestamp of each data point in the timestamp set of the page and determining whether the data value of each data point is within the set data value range according to the data value of each data point in the data value set of the page; and screening all the data points of which the timestamp is within the given timestamp range and/or the data value is within the set data value range in the page as the data points that satisfy the query filter condition.

Still taking the above-mentioned query filter condition being the given timestamp range as an example, it is determined whether the timestamp of each data point is within the given timestamp range according to the timestamp of each data point in the pages that satisfy the query filter condition, this data point is the data point that satisfies the query filter condition if it is within the given timestamp range, the data points that satisfy the query filter condition of all the data points in each page are filtered out, and the data points that satisfy the query filter condition of all the pages are summarized to acquire all the data points that satisfy the query filter condition in the column of the time series data.

If the query filter condition is the set data value range and the query filter condition is the given timestamp range and the set data value range, the query method is similar to that in which the query filter condition is the given timestamp range, and is no longer described herein.

Figure 3:
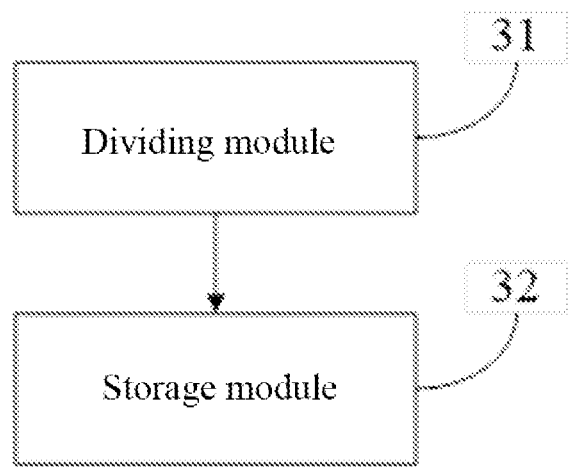
FIG. 3 is a block diagram showing the connection of a columnar storage system for time series data according to an embodiment of the present disclosure.

Referring to FIG. 3, a columnar storage system for time series data of another embodiment of the present disclosure is provided, including a dividing module 31 and a storage module 32.

The dividing module 31 is configured to divide a column of time series data into a plurality of pages, wherein each page stores a part of data points of the column of time series data and the sum of the data points stored in all the pages is all the data points in the column of time series data.

The storage module 32 is configured to set two parts, i.e., a page header and a page body, for each page, store summary index information of all the data points in the page in the page header of the page and store data value information of all the data points in the page in the page body of the page.

Figure 4:
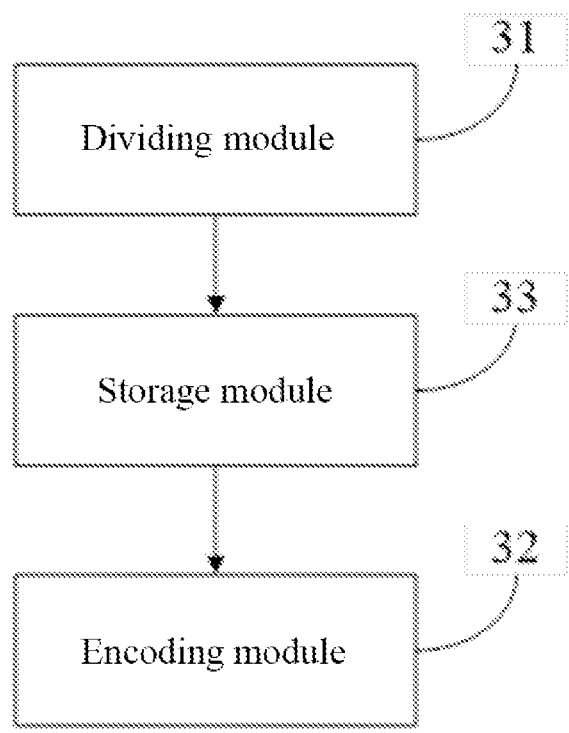
FIG. 4 is a block diagram showing the connection of a columnar storage system for time series data according to another embodiment of the present disclosure.

Referring to FIG. 4, a columnar storage system for time series data of another embodiment of the present disclosure is provided, including a dividing module 31, an encoding module 32 and a storage module 33.

The dividing module 31 is configured to divide a column of time series data into a plurality of pages, wherein each page stores a part of data points of the column of time series data and the sum of the data points stored in all the pages is all the data points in the column of time series data.

The storage module 32 is configured to set two parts, i.e., a page header and a page body, for each page, store summary index information of all the data points in the page in the page header of the page and store data value information of all the data points in the page in the page body of the page.

In an embodiment of the present disclosure, the summary index information in the page header of each page includes the number of all the data points in the page, a maximum value in timestamps corresponding to all the data points, a minimum value in the timestamps corresponding to all the data points, a maximum value in the data values of all the data points and a minimum value in the data values of all the data points; and the data value information of all the data points in the page body of each page includes a timestamp set for all the data points of the page and a data value set for all the data points of the page.

All the timestamps in the timestamp set have consistent data types and the data value set includes different data types of data values. Correspondingly, the encoding module 33 is configured to perform data encoding on all the timestamps in the timestamp set using the same data encoding method; and is further configured to encode respective data value using a corresponding data encoding method according to the data type of respective data value in the data value set.

Figure 5:
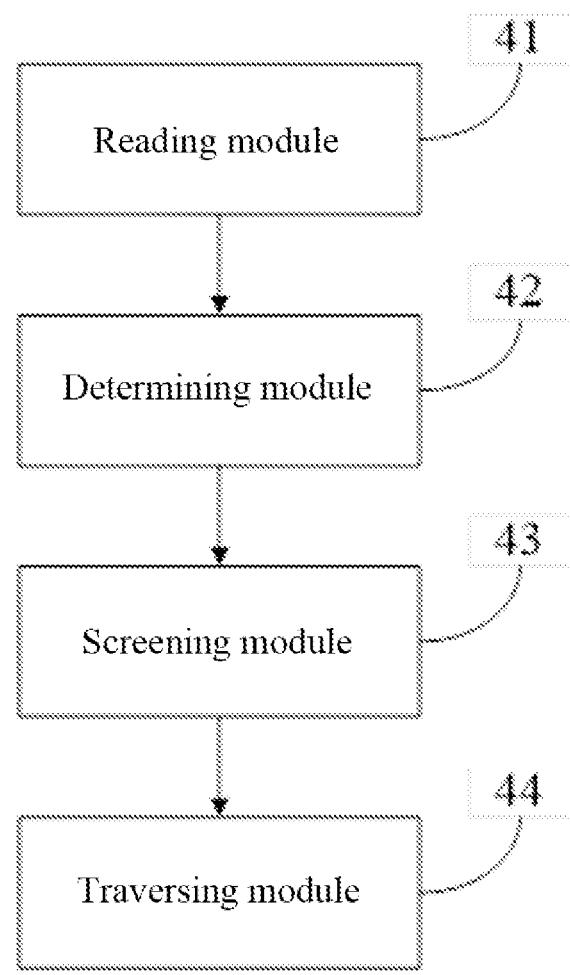
FIG. 5 is a block diagram showing the connection of a query system for time series data according to an embodiment of the present disclosure.

Referring to FIG. 5, a query system for time series data according to an embodiment of the present disclosure is provided, including a reading module 41, a determining module 42, a screening module 43, and a traversing module 44.

The reading module 41 is configured to read one page of a column of time series data.

The determining module 42 is configured to determine whether data points that satisfy a query filter condition are present in the page according to summary index information in the page; and The screening module 43 is configured to screen all the data points that satisfy the query filter condition and add them into a query result set if the determining module determines that the data points that satisfy the query filter condition are present in the page; and call the reading module to read a next page if the determining module determines that no data points that satisfy the query filter condition are present in the page.

The traversing module 44 is configured to traverse all pages to get a final query result set.

Figure 6:
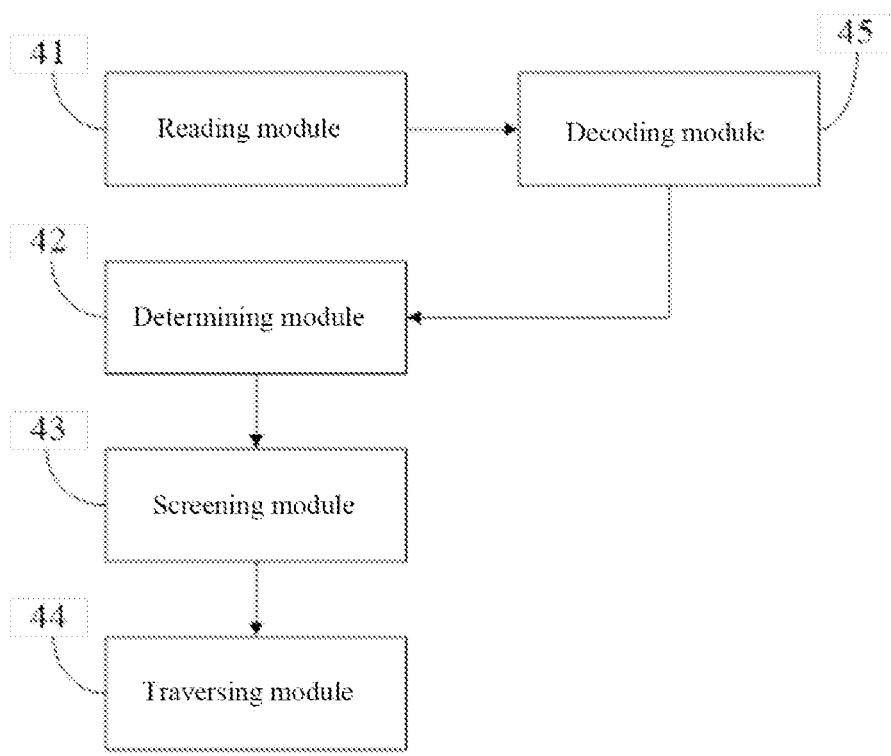
FIG. 6 is a block diagram showing the connection of a query system for time series data according to another embodiment of the present disclosure.

Referring to FIG. 6, a query system for time series data according to another embodiment of the present disclosure is provided, including a reading module 41, a determining module 42, a screening module 43, a traversing module 44 and a decoding module 45.

In this embodiment, the reading module 41 is configured to read one page of a column of time series data.

The determining module 42 is configured to determine whether data points that satisfy a query filter condition are present in the page according to summary index information in the page.

The screening module 43 is configured to screen all the data points that satisfy the query filter condition and add them into a query result set if the determining module determines that the data points that satisfy the query filter condition are present in the page; and call the reading module 41 to read a next page if the determining module determines that no data points that satisfy the query filter condition are present in the page.

The traversing module 44 is configured to traverse all pages to get a final query result set.

In this embodiment, the query filter condition includes a given timestamp range and/or a set data value range. Correspondingly, the determining module 42 is configured to determine whether a timestamp range corresponding to all the data points in each page and the given timestamp range have an overlapping portion according to a maximum value in timestamps corresponding to all the data points and a minimum value in the timestamps corresponding to all the data points in the summary index information in each page and determine whether a data value range corresponding to all the data points in each page and the set data value range have an overlapping portion according to a maximum value in data values of all the data points and a minimum value in the data values of all the data points in the summary index information in each page. It is determined that the data points that satisfy the query filter condition are present in the page if the timestamp range corresponding to all the data points in each page and the given timestamp range have the overlapping portion and/or the data value range corresponding to all the data points in each page and the set data value range have the overlapping portion, and otherwise, it is determined that no data points that satisfy the query filter condition are present in the page. The decoding module 45 is configured to decode data information of all the data points in each page that satisfies the query filter condition to acquire decoded data information, wherein the data information includes a timestamp set for all the data points and a data value set for all the data points in the page.

The determining module 42 is further configured to determine whether the timestamp of each data point is within the given timestamp range according to the timestamp of each data point in the page and determine whether the data value of each data point is within the set data value range according to the data value of each data point in each page, determine that the data point satisfies the query filter condition if the timestamp of the data point in this page is within the given timestamp range and/or the data value is within the set data value range, and otherwise, determine that the data point does not satisfy the query filter condition.

The present disclosure also provides a non-transitory computer readable storage medium storing computer instructions for enabling a computer to perform the columnar storage method for time series data provided by the corresponding embodiments above, for example, including: dividing a column of time series data into a plurality of pages, wherein each page stores a part of data points of the column of time series data and the sum of the data points stored in all the pages is all the data points in the column of time series data; and setting two parts, i.e., a page header and a page body, for each page, storing summary index information of all the data points in the page in the page header of the page and storing data value information of all the data points in the page in the page body of the page.

In addition, the computer instructions enable the computer to perform the columnar storage method for time series data provided by the corresponding embodiments above, for example, including: reading one page of a column of time series data, determining whether the page satisfies a query filter condition according to summary index information in the page; skipping and reading a next page if the query filter condition is not satisfied; screening all the data points that satisfy the query filter condition and adding them into a query result set if the query filter condition is satisfied; and traversing all pages to get a final query result set.

It can be understood by those of ordinary skill in the art that all or part of the steps of implementing the method embodiments above may be completed by using hardware related to the program instructions. The foregoing program may be stored in a computer readable storage medium, and the program performs foregoing steps including the method embodiments above when executed. The foregoing storage medium includes: a medium that can store program codes, such as a ROM, a RAM, a magnetic disk, or an optical disk.

Through the description of the embodiments above, those skilled in the art can clearly understand that the various embodiments can be implemented by means of software and a necessary general hardware platform, and of course, by hardware. Based on such understanding, the technical solution of the present disclosure or a part of the technical solution, which is essential or contributes to the prior art, may be embodied in the form of a software product, which is stored in a storage medium such as ROM/RAM, magnetic Discs, optical discs, etc., including several instructions to enable a computer device (which may be a personal computer, a server, or a network device, etc.) to perform various embodiments or a part of the methods described in various embodiments.

By the columnar storage method and system for time series data and the query method and system for time series data provided by the present disclosure, timestamps and specific data values of a group of time series data can be stored in one column and thus the I/O of a magnetic disc is reduced during data query; during the query, the data is divided according to pages, summary index information is established respectively, the pages that satisfy a query filter condition are firstly filtered out according to summary index information of each page, and then all the data points in the pages that satisfy the query filter condition are decoded and thus unnecessary decoding is avoided and the query speed of data is accelerated; and the data is divided according to pages, the timestamp and the data value are encoded separately and optimal coding methods can be selected in combination with different types of the data, thereby improving the compression ratio of the data and reducing the use of storage space.

Finally, the methods of the present disclosure are only preferred embodiments and are not intended to limit the scope of the present disclosure. Any modifications, equivalent substitutions, improvements, etc. made within the spirit and scope of the present disclosure are included within the scope of the present disclosure.

The invention claimed is:

1. A columnar storage method for time series data, comprising:
  dividing a column of time series data into a plurality of pages, each page stores a part of data points of the column of time series data and a sum of the data points stored in all the pages is all the data points in the column of time series data; and
  setting two parts of a page header and a page body, for each page, storing summary index information of all the data points in the page in the page header of the page and storing data value information of all the data points in the page in the page body of the page;
  wherein the time series data of the column of time series data is recorded in a time order and each of the data points of the time series data comprises a timestamp and a specific data value;

wherein the timestamps of all data points in each respective page of the plurality of pages are stored in a timestamp set;
wherein the data values of all data points in each respective page of the plurality of pages are stored in a data value set;
wherein each timestamp in the timestamp set and each data value in the data value set of each respective page of the plurality of pages are in one-to-one correspondence based on identification information; and
wherein the summary index information of each respective page of the plurality of pages includes information indicative of whether the data points within the respective page include data which satisfies
  (i) query conditions relating to a range of timestamps within the time series data, and
  (ii) query conditions relating to a range of data values within the time series data.

2. The storage method of claim 1, wherein the summary index information in the page header of each page comprises a number of all the data points in the page, a maximum value in timestamps corresponding to all the data points, a minimum value in the timestamps corresponding to all the data points, a maximum value in data values of all the data points and a minimum value in the data values of all the data points; and
the data value information of all the data points in the page body of each page comprises a timestamp set for all the data points of the page and a data value set for all the data points of the page.

3. The storage method of claim 2, wherein all the timestamps in the timestamp set have consistent data types and the data value set comprises different data types of data values; the storage method further comprises:
performing data encoding on all the timestamps in the timestamp set using a same data encoding method; and
encoding respective data value using a corresponding data encoding method according to a data type of respective data value in the data value set.

4. A query method based on the storage method of claim 1, comprising:
reading one page of a column of time series data, determining whether data points that satisfy a query filter condition are present in the page according to summary index information in the page;
skipping and reading a next page when they are not present in the page and screening all the data points that satisfy the query filter condition and adding them into a query result set when they are present in the page; and
traversing all pages of the column of the time series data to get a final query result set.

5. The query method of claim 4, wherein the query filter condition comprises a given timestamp range and/or a set data value range, and the determining whether data points that satisfy the query filter condition are present in the page according to the summary index information in the page specifically comprises:
determining whether a timestamp range corresponding to all the data points in each page and the given timestamp range have an overlapping portion according to a maximum value in timestamps corresponding to all the data points and a minimum value in the timestamps corresponding to all the data points in the summary index information in each page and determining whether a data value range corresponding to all the data points in each page and the set data value range have an overlapping portion according to a maximum value in data values of all the data points and a minimum value in the data values of all the data points in the summary index information in each page; and
determining that the data points that satisfy the query filter condition are present in the page when the timestamp range corresponding to all the data points in each page and the given timestamp range have the overlapping portion and/or the data value range corresponding to all the data points in each page and the set data value range have the overlapping portion, and otherwise, determining that no data points that satisfy the query filter condition are present in the page.

6. The query method of claim 4, wherein the query method further comprises:
decoding data information of all the data points in the page to obtain decoded data information when the data points that satisfy the query filter condition are present in the page, wherein the data information comprises a timestamp set for all the data points and a data value set for all the data points in the page.

7. The query method of claim 6, wherein the screening all the data points that satisfy the query filter condition and adding them into the query result set when the data points that satisfy the query filter condition are present specifically comprise:
determining whether a timestamp of each data point is within the given timestamp range according to the timestamp of each data point in the timestamp set of the page and determining whether a data value of each data point is within the set data value range according to the data value of each data point in the data value set of the page; and
screening all the data points of which the timestamp is within the given timestamp range and the data value is within the set data value range in the page as the data points that satisfy the query filter condition.

8. A non-transitory computer readable storage medium storing computer instructions for enabling a computer to perform the columnar storage method for time series data of claim 1.

9. The storage method of claim 1, wherein each page occupies a same fixed storage space.

10. A non-transitory computer readable storage medium storing computer instructions for enabling a computer to perform:
a columnar storage method for time series data, comprising
dividing a column of time series data into a plurality of pages, each page stores a part of data points of the column of time series data and a sum of the data points stored in all the pages is all the data points in the column of time series data, and
setting two parts of a page header and a page body, for each page, storing summary index information of all the data points in the page in the page header of the page and storing data value information of all the data points in the page in the page body of the page,
wherein the time series data of the column of time series data is recorded in a time order and each of the data points of the time series data comprises a timestamp and a specific data value,
wherein the timestamps of all data points in each respective page of the plurality of pages are stored in a timestamp set;
wherein the data values of all data points in each respective page of the plurality of pages are stored in a data value set, wherein each timestamp in the timestamp set and each data value in the data value set of each respective page of the plurality of pages are in one-to-one correspondence based on identification information, and wherein the summary index information of each respective page of the plurality of pages includes information indicative of whether the data points within the respective page include data which satisfies
   (i) query conditions relating to a range of timestamps within the time series data, and
   (ii) query conditions relating to a range of data vales within the time series data;

a query method, comprising
   reading one page of a column of time series data, determining whether data points that satisfy a query filter condition are present in the page according to summary index information in the page,
   skipping and reading a next page when they are not present in the page and screening all the data points that satisfy the query filter condition and adding them into a query result set when they are present in the page, and
   traversing all pages of the column of the time series data to get a final query result set.

* * * * *